No. 748,984. Patented January 5, 1904.

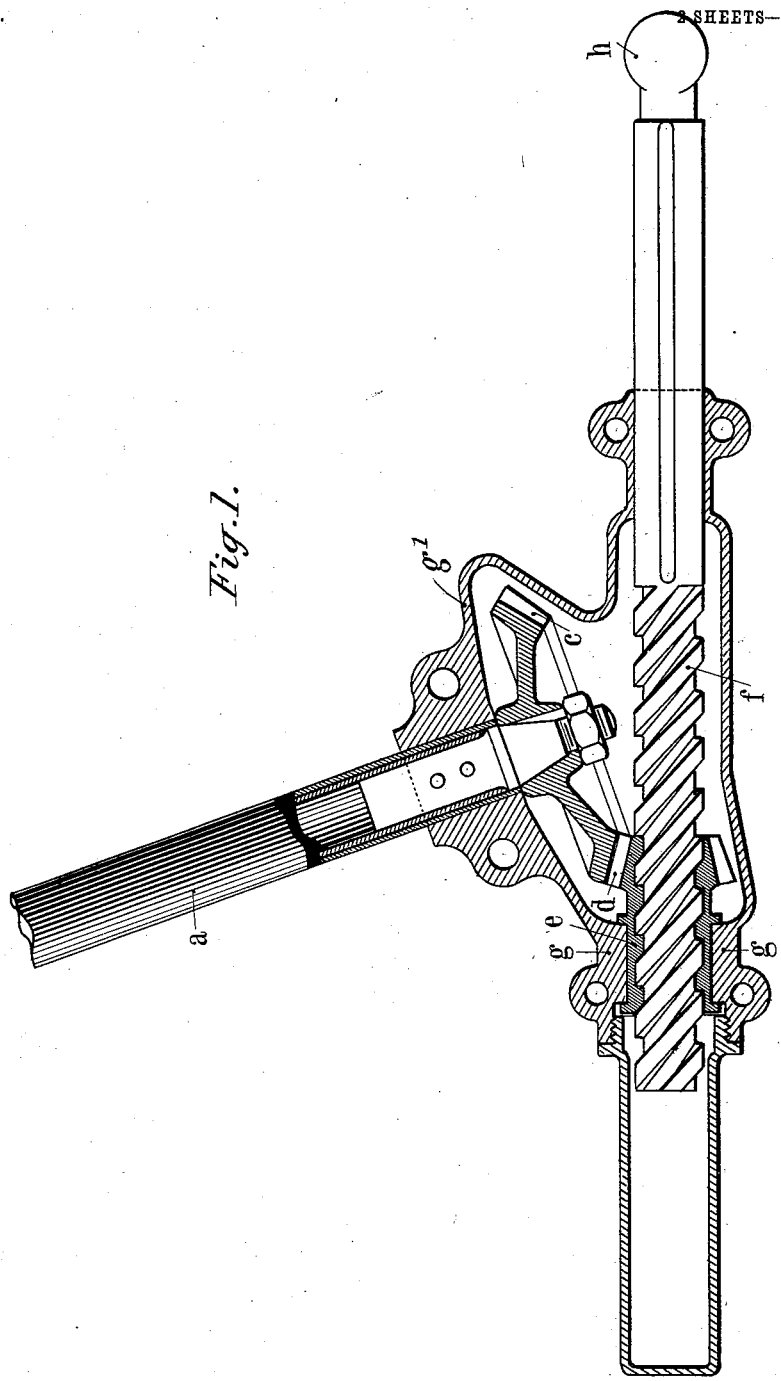

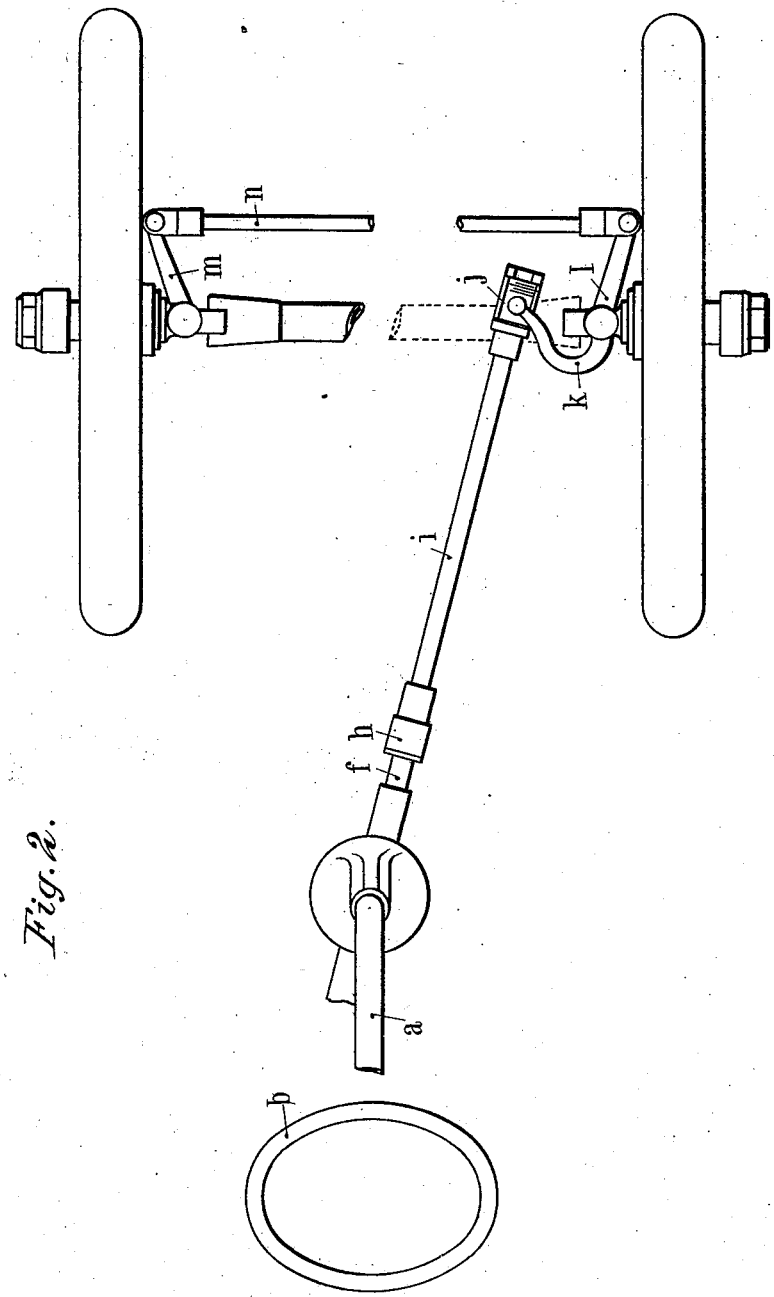

UNITED STATES PATENT OFFICE.

LOUIS RENAULT, OF BILLANCOURT, FRANCE.

STEERING-GEAR FOR MOTOR-VEHICLES.

SPECIFICATION forming part of Letters Patent No. 748,984, dated January 5, 1904.

Application filed January 23, 1903. Serial No. 140,269. (No model.)

*To all whom it may concern:*

Be it known that I, LOUIS RENAULT, a citizen of the French Republic, residing at Billancourt, Seine, France, have invented certain new and useful Improvements in Steering-Gear for Motor and other Vehicles, of which the following is a specification.

This invention has reference to steering-gear for motor and other vehicles; and in order that my invention may be readily understood and carried into effect I will describe the same fully with reference to the accompanying drawings, in which—

Figure 1 is a section of the mechanism for controlling the steering-gear constructed in accordance with my invention. Fig. 2 is a plan of the whole of a steering-gear.

The steering-rod *a* is, as usual, provided with a hand-wheel *b* and so arranged as to be within easy reach of the conductor or driver of the vehicle. The end of said rod *a* is provided with a bevel-pinion *c*, adapted to mesh with a smaller pinion *d*, formed on the exterior surface of a sleeve *e*, forming a nut to a screw *f*, said sleeve being adapted to turn in a bearing *g*. The screw *f* is pivoted at *h* to a rod or tube *i*, the other extremity *j* of which (placed near the divided axle) is pivoted to the ordinary controlling-lever *k* of the axle, which latter is constituted by two spindles carrying pivoted levers *l m*, connected by the bar *n*. The articulations from the tube *i* to the screw *f* and to the controlling-lever *k* are constituted by sleeves in the interior of which are cups which permit of the necessary adjustment. The nut *e* can only be rotated without being capable of longitudinal displacement in the bearing *g*.

My improved apparatus presents the advantage of realizing a steering almost completely irreversible, very solid, and not wearing away, since the screw works normally without the intervention of a lever-arm. Furthermore, the cylindrical screw permits of employing a nut of very great length and bearing consequently on a large surface.

From the foregoing description it will be seen that I have provided a steering-rod consisting of three sections *a*, *f*, and *i*, the rod-section *a* being mounted in a gear-casing *g'*, which is in one piece with the bearing *g*. The member *f* of the rod is arranged for slidable or traveling movement in the gear-casing *g* and in the non-slidable and revoluble nut *e*. This member *f* of the rod is pivotally connected with the member *i*, the latter in turn having an articulated connection with the lever *k*, which in turn operates, through the rod *n*, the members of the divided axle.

Having now particularly described and ascertained the nature of my said invention and in what manner the same is to be performed, I declare that what I claim is—

1. In a steering-gear for motor and other vehicles, the combination with a divided axle having its members connected for conjoint movement, of a bent lever extending from one axle member, a rod connected loosely to said lever, a gear-casing having a bearing, a revoluble nut confined in said bearing, a threaded rod slidable in the casing, screwed in the nut and jointed to the first-named rod, and a steering-rod geared to the nut.

2. In a steering-gear, the combination of a gear-casing having a spindle-bearing, a nut-bearing, and a guide-opening, a female threaded elongated nut or sleeve held against endwise travel in said nut-bearing and housed within the gear-casing, a threaded rod slidable in the guide-opening of said casing and screwed in the nut or sleeve, a steering-spindle mounted in the spindle-bearing, and bevel-gears connecting the spindle and the nut or sleeve, said gears being housed within the casing.

3. In a steering-gear for motor and other vehicles, the combination with a bearing and a gear-casing, of a female threaded sleeve mounted in said bearing to rotate therein and to be held from endwise movement thereby, a steering-rod having means for turning the same and mounted in a part of the gear-casing, gearing connecting said steering-rod with said threaded sleeve, a threaded rod slidably mounted in the gear-casing and having threaded engagement with said sleeve, an axle-controlling lever, and a third rod pivotally connected with the threaded rod and said lever.

In witness whereof I have hereunto set my hand in presence of two witnesses.

LOUIS RENAULT.

Witnesses:
 FELIX BARON,
 AUGUSTUS E. INGRAM.